US008819430B2

(12) United States Patent
Ihori et al.

(10) Patent No.: US 8,819,430 B2
(45) Date of Patent: *Aug. 26, 2014

(54) COMMUNICATION DEVICE, COMMUNICATON SYSTEM, COMMUNICATION METHOD, AND PROGRAM

(75) Inventors: Akihiro Ihori, Kanagawa (JP); Itaru Maekawa, Tokyo (JP)

(73) Assignee: Sony Corporation, Tokyo (JP)

( * ) Notice: Subject to any disclaimer, the term of this patent is extended or adjusted under 35 U.S.C. 154(b) by 419 days.

This patent is subject to a terminal disclaimer.

(21) Appl. No.: 12/951,122

(22) Filed: Nov. 22, 2010

(65) Prior Publication Data

US 2011/0131631 A1    Jun. 2, 2011

(30) Foreign Application Priority Data

Nov. 27, 2009   (JP) .................................. 2009-270643

(51) Int. Cl.
*H04L 9/32*        (2006.01)
*G06F 21/44*       (2013.01)
*H04L 29/06*       (2006.01)

(52) U.S. Cl.
CPC .............. *G06F 21/44* (2013.01); *G06F 21/445* (2013.01); *H04L 63/0492* (2013.01)
USPC ........................................................ 713/169

(58) Field of Classification Search
CPC .... G06F 21/44; G06F 21/445; H04L 63/0492
See application file for complete search history.

(56) References Cited

U.S. PATENT DOCUMENTS

| 2006/0044153 | A1* | 3/2006 | Dawidowsky ........... 340/825.22 |
| 2008/0207128 | A1* | 8/2008 | Mikko ........................ 455/41.2 |
| 2009/0104875 | A1* | 4/2009 | Naniyat ....................... 455/41.3 |
| 2009/0193139 | A1  | 7/2009 | Sano et al. |
| 2009/0196309 | A1  | 8/2009 | Fujinaga et al. |
| 2010/0267334 | A1* | 10/2010 | Hashimoto et al. .......... 455/41.2 |

FOREIGN PATENT DOCUMENTS

| EP | 2 164 229 A1 | 3/2010 |
| EP | 2 226 728 A1 | 9/2010 |
| EP | 2226728 A1 * | 9/2010 |
| JP | 2008-192261 A | 8/2008 |
| WO | WO 2006/111782 A1 | 10/2006 |
| WO | WO 2009/045085 A1 | 4/2009 |
| WO | WO 2009/084506 A1 | 7/2009 |

* cited by examiner

*Primary Examiner* — Peter Poltorak
*Assistant Examiner* — Quy Pham
(74) *Attorney, Agent, or Firm* — Sony Corporation

(57) ABSTRACT

There is provided a communication device, which includes a physical layer which performs close-range one-to-one communication with a device B through electric field coupling or magnetic field coupling, an authentication information changing unit which dynamically changes device information for mutual authentication according to a type of data selected on an application, a protocol selection unit which selects one protocol that can be utilized by the communication device and the device B, a start information transmission unit which transmits the device information and information showing the selected protocol to the device B in order to make the device B start an application corresponding to the type of data and the selected protocol, and a protocol conversion unit which converts a protocol utilized by the application into a protocol utilized by the physical layer in order to transfer data between the applications of the communication device and the device B.

11 Claims, 10 Drawing Sheets

COMMUNICATION DEVICE, COMMUNICATON SYSTEM, COMMUNICATION METHOD, AND PROGRAM

BACKGROUND OF THE INVENTION

1. Field of the Invention

The present invention relates to a communication device, a communication system, a communication method, and a program.

2. Description of the Related Art

There has been known a communication system which performs close-range one-to-one communication between communication devices through electric field coupling or magnetic field coupling. In the communication system, when two communication devices are disposed within a communication range, communication connection, mutual authentication, and negotiation are performed between the communication devices. A predetermined application is then started, the protocol of the application is converted into a protocol for data transmission, and data transmission starts between the applications.

In the communication system, various applications using different protocols are supported. Thus, one communication device designates a protocol in the negotiation, and the other communication device starts the application corresponding to the designated protocol. Japanese Patent Application Laid-Open No. 2008-192261 discloses a reproducing method and a reproducing program. In this method and program, when a playlist recorded in a digital music player is reproduced by a personal computer, the playlist is easily reproduced without using a special application.

SUMMARY OF THE INVENTION

If there is only one application corresponding to the protocol, an application to be started can be specified by designation of a protocol. However, if there is a plurality of applications corresponding to the protocol, the application to be started may not be specified by designation of a protocol.

In light of the foregoing, it is desirable to provide a communication device, a communication system, a communication method, and a program which, even if there is a plurality of applications corresponding to a protocol, can specify an application to be started.

According to a first embodiment of the present invention, there is provided a communication device including a physical layer which performs close-range one-to-one communication with another communication device through electric field coupling or magnetic field coupling, an authentication information changing unit which dynamically changes authentication information, used in mutual authentication with the another communication device, according to a type of data selected on an application of the communication device, a protocol selection unit which selects one protocol that can be utilized by the communication device and the another communication device, a start information transmission unit which transmits the authentication information and information showing the selected protocol to the another communication device in order to make the another communication device start an application corresponding to the type of data and the selected protocol, and a protocol conversion unit which converts a protocol utilized by the application into a protocol utilized by the physical layer in order to transfer data between the applications of the communication device and the another communication device.

According to the above constitution, authentication information is dynamically changed according to the type of data selected on an application to be transmitted to another communication device. One protocol which can be used by the communication device and another communication device is selected, and information showing the selected protocol is transmitted to another communication device. An application corresponding to the type of data and the selected protocol is then started by another communication device. According to this constitution, even if there is a plurality of applications corresponding to a protocol, another communication device refers to authentication information dynamically changed according to the type of selected data and can specify an application to be started.

The communication device may further include a start information reception unit which receives, from the another communication device, authentication information, dynamically changed according to a type of data selected on an application of the another communication device, and information showing a protocol selected as a protocol that can be utilized by the communication device and the another communication device, and an application starting unit which starts an application corresponding to the type of data and the selected protocol.

The communication device may be operated in a mode selected from a first mode in which the communication device receives an application service from the another communication device and a second mode in which the communication device gives the application service to the another communication device, when the communication device is operated in the first mode, the authentication information is dynamically changed, information showing the authentication information and the selected protocol is transmitted to the another communication device, and an application corresponding to the type of data and the selected protocol is started by the another communication device, and when the communication device is operated in the second mode, the communication device receives the dynamically changed authentication information and the information showing the selected protocol from the another communication device, and an application corresponding to the type of data and the selected protocol is started.

The communication device may be operated in a third mode operated by selecting any one of the first mode and the second mode, according to a mode of the another communication device, when the another communication device is operated in the second mode, the communication device is operated as in the case of being operated in the first mode, when the another communication device is operated in the first mode, the communication device is operated as in the case of being operated in the second mode.

The authentication information changing unit may change at least a portion of device information, included in the authentication information, according to the type of data selected on an application of the communication device.

According to a second embodiment of the present invention, there is provided a communication system including a first communication device which performs close-range one-to-one communication with a second communication device through electric field coupling or magnetic field coupling, and the second communication device that corresponds to the communication device of the first embodiment of the present invention.

According to a third embodiment of the present invention, there is provided a communication method for a communication device including the steps of: establishing connection of close-range one-to-one communication with another communication device through electric field coupling or magnetic field coupling, dynamically changing authentication information, used in mutual authentication with the another communication device, according to a type of data selected on an application of the communication device, selecting one protocol that can be utilized by the communication device and the another communication device, transmitting the authentication information and information showing the selected protocol to the another communication device in order to make the another communication device start an application corresponding to the type of data and the selected protocol, and converting a protocol utilized by the application into a protocol utilized by a physical layer in order to transfer data between the applications of the communication device and the another communication device.

According to a fourth embodiment of the present invention, there is provided a program for causing a computer to execute the communication method for a communication device that corresponds to the third embodiment of the present invention. The program may be provided using a computer-readable recording medium or may be provided through communication means.

As described above, the present invention can provide a communication device, a communication system, a communication method, and a program which, even if there is a plurality of applications corresponding to a protocol, can specify an application to be started.

DETAILED DESCRIPTION OF THE EMBODIMENT

Figure 1:
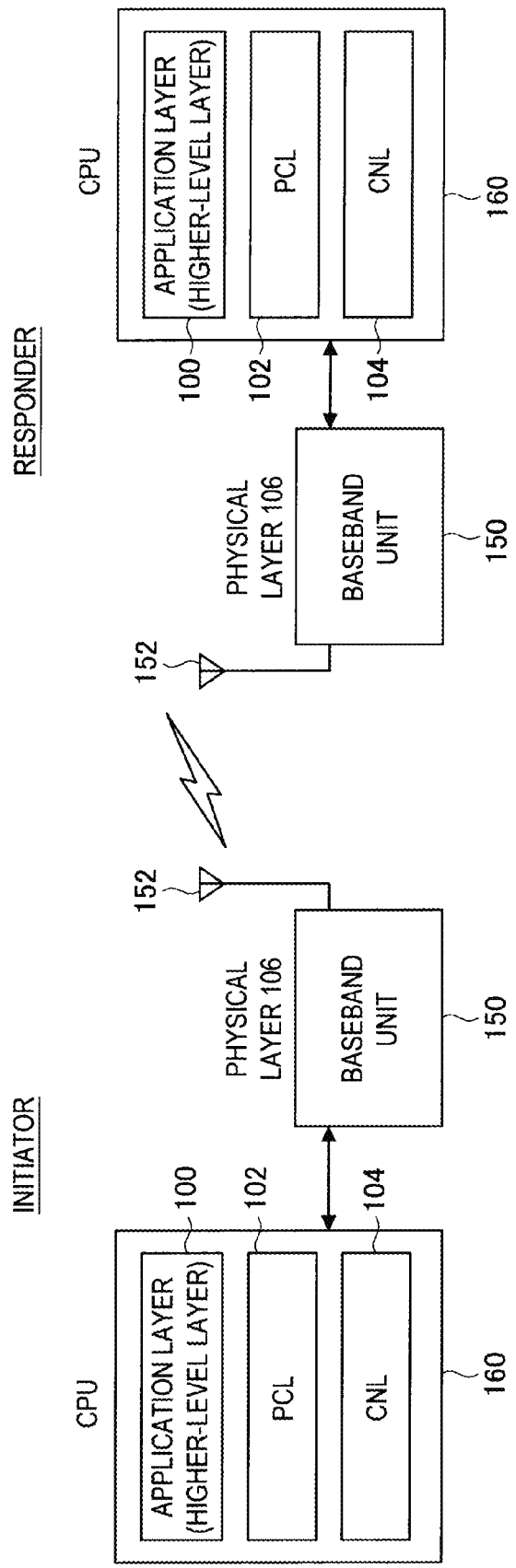
FIG. 1 is a view showing a constitution of a communication system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. COMMUNICATION SYSTEM

First, a communication system according to an embodiment of the present invention will be described. FIG. 1 is a view showing a constitution of the communication system.

As shown in FIG. 1, the communication system is constituted of the device operated as an initiator and the device operated as a responder. The device is an information processing device having a communication function, such as a mobile phone, a digital camera, a music player, a personal computer, and a personal digital assistant (PDA). The initiator and the responder are loaded with communication devices having functional configurations substantially the same as each other. In the communication system, the initiator requests a connection to the responder, and the responder returns a connection response to the initiator, so that a communication connection is established between the initiator and the responder.

A communication device mounted in the device is configured to include a baseband unit 150, a communication coupler 152, and a CPU 160.

The baseband unit 150 is constituted of a communication chip and is configured to include a transmission processing unit and a reception processing unit (not shown). The transmission processing unit of the initiator generates a transmission signal from transmission data in response to a transmission request from an application to transmit the transmission signal to the responder through the communication coupler 152. The reception processing unit of the responder receives the signal through the communication coupler 152 to generate reception data from the received signal and thus to supply the reception data to the application.

The communication coupler 152 is constituted of an electric field coupler and performs communication through electric field coupling. In the communication coupler 152, when the communication coupler 152 approaches the other communication coupler 152 with a distance of approximately 3 cm, capacitive coupling is performed. Hereinafter, although the case where communication is performed through electric field coupling will be described, a case where communication is performed through magnetic field coupling can be similarly described.

The CPU 160 executes a program recorded in, for example, a memory (not shown) of the communication device to thereby be operated as an application layer 100 (hereinafter also referred to as a higher-level layer 100), a protocol conversion layer 102 (PCL), and a connection layer 104 (CNL). The baseband unit 150 is operated as a physical layer (PHY) 106.

The higher-level layer 100 provides various services, using data communication, to users and other programs. In the higher-level layer 100, various applications are executed. The PCL 102 converts data, commands, and the like generated by the higher-level layer 100 into a data format that can be processed by the CNL 104 which is a lower-level layer. The PCL 102 performs communication connection establishment, connection release, device authentication, arbitration of device mode, negotiation, initialization of the higher-level layer 100, and the like. The CNL 104 packetizes the data supplied from the PCL 102 to supply the data as transmission data to the physical layer 106 and extracts a packet from the data supplied from the physical layer 106 to supply the packet as reception data to the higher-level layer 100. The physical layer 106 has an error correction function, a preamble sense function, and the like. The PCL 102 mutually converts between various protocols used by the higher-level layer 100 and protocols used by the physical layer 106 for data transmission. According to this constitution, data transfer between applications corresponding to various protocols and executed in the higher-level layer 100 can be performed through the physical layer 106.

2. COMMUNICATION DEVICE

Figure 2:
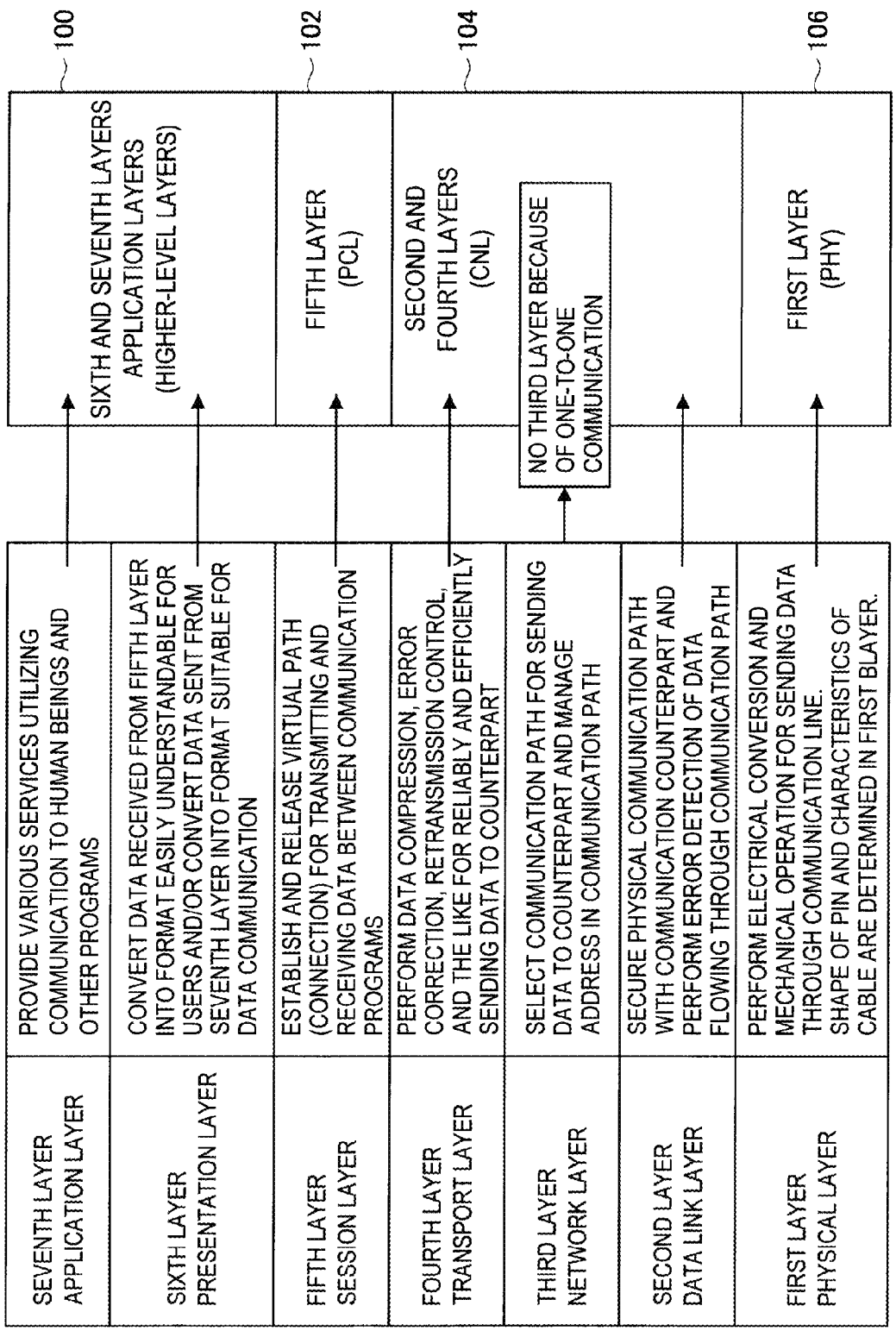
FIG. 2 is a view showing an OSI layer model of a communication device.
Figure 3:
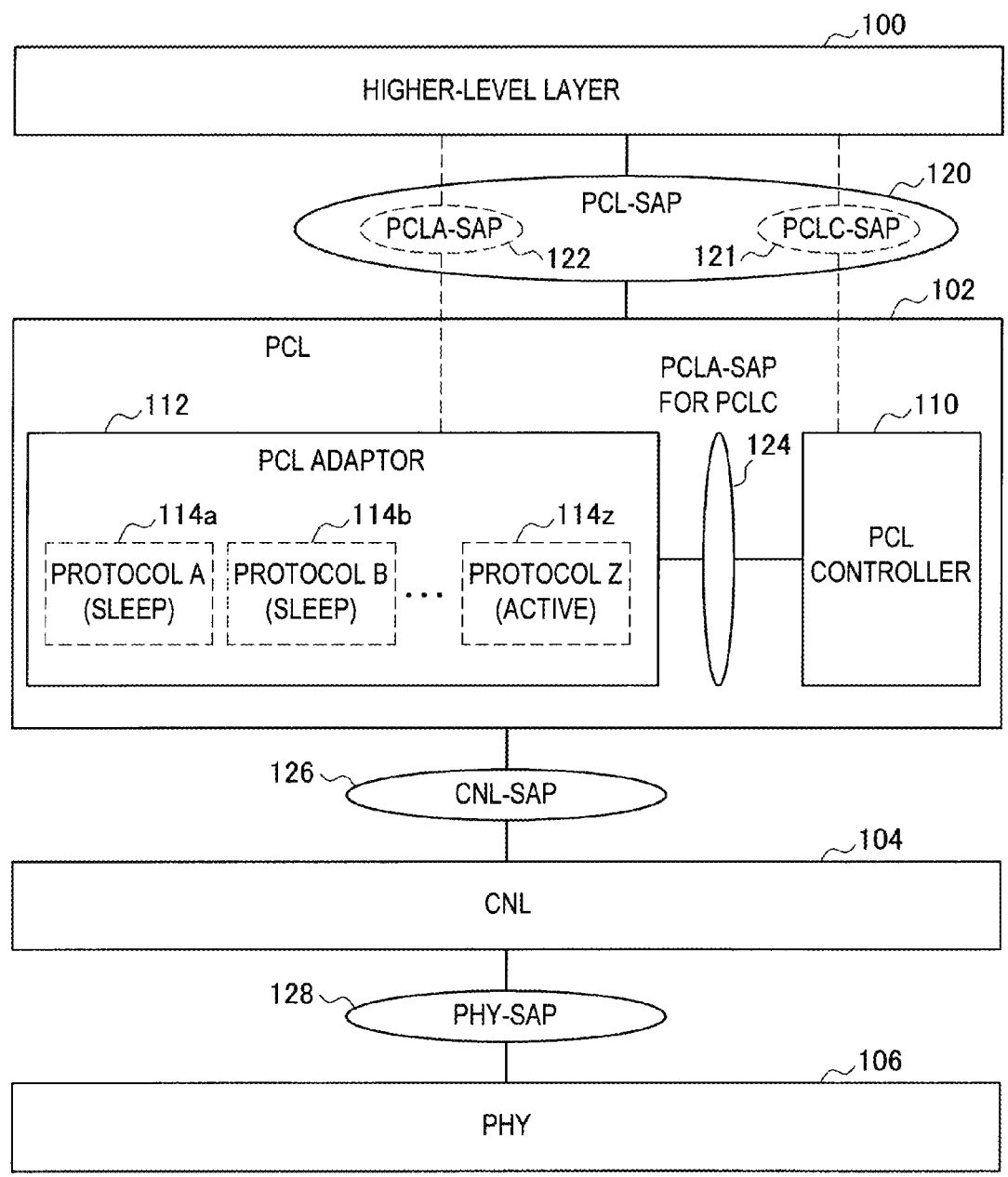
FIG. 3 is a view showing a service access point of each layer of the OSI layer model.
Figure 4:
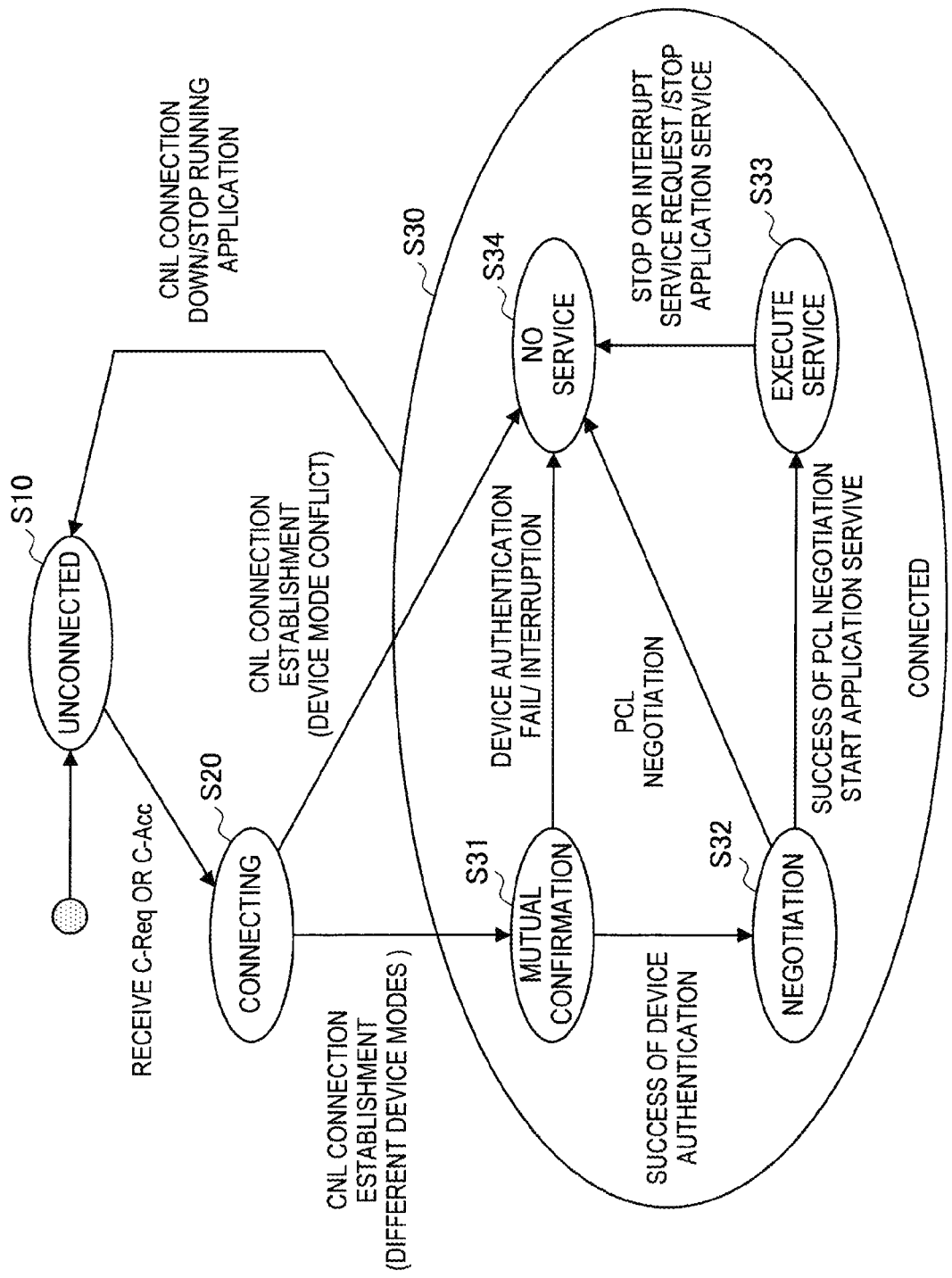
FIG. 4 is a view showing a state transition of a PCL controller.

Next, a communication device according to an embodiment of the present invention will be described. FIG. 2 is a view showing an OSI layer model of the communication device. FIG. 3 is a view showing a service access point (SAP) of each layer of the OSI layer model. FIG. 4 is a view showing a state transition of a PCL controller.

As shown in FIG. 2, the higher-level layer 100 corresponds to an application layer and a presentation layer in an OSI reference model. The PCL 102 corresponds to a session layer. The CNL 104 corresponds to a transport layer and a data link layer. The physical layer 106 corresponds to a physical layer. Since the communication device performs one-to-one communication, the function corresponding to a network layer in the OSI reference model can be omitted. The higher-level layer 100 is operated as an authentication information changing unit, a protocol selection unit, and an application starting unit. The PCL 102 is operated as a start information transmission/reception unit and a protocol conversion unit.

As shown in FIG. 3, the PCL 102 is sectioned into two functional blocks, one block is a PCL controller (PCLC) 110 while the other block is a PCL adaptor (PCLA) 112. The PCLC 110 provides common services such as initialization and basic communication (connection establishment, connection release, and device authentication) to the higher-level layer 100.

The PCLA 112 performs data transmission after the PCLC 110 establishes a communication connection. The PCLA 112 converts a protocol (OBEX (OBject EXchange), SCSI (Small Computer System Interface), and other general protocols) used by applications executed in the higher-level layer 100 into a data packet that can be processed by the CNL 104. The PCLA 112 has conversion modules 114a to 114z for each protocol. Only one of the conversion modules 114 (for example, the conversion module 114z) controlled by the PCLC 110 is in an active state, and the other modules are in a sleep state.

The higher-level layer 100, the PCL 102, the CNL 104, and the physical layer 106 have therebetween service access points (SAP) as interlayer interfaces. The PCL 102 provides a PCL-SAP 120 (a PCLC-SAP 121 and a PCLA-SAP 122) to the higher-level layer 100. The PCLA 112 provides a PCLA-SAP 124 for PCLC, utilized for realizing control by the PCLC 110, to the PCLC 110. The CNL 104 provides a CNL-SAP 126 to the PCL 102. The physical layer 106 provides a PHY-SAP 128 to the CNL 104.

The PCLC 110 uses a mechanism provided by the CNL 104 and has three functions including a connection management function, a device authentication function, and an application service control function to be described as follows.

The connection management function is a function of managing establishment and release of connection between two devices. In this function, when two devices are disposed within the communication range, if their device modes are not reactive modes to be described, CNL connection is established. In the function, when connection is established, exchange and arbitration of a PCLC version and the device mode are performed using a PCL parameter.

The device authentication function is a function of authenticating a CNL-connected device. The device authentication is mutually performed between two devices. The device compares a unique ID (UID) of a peer device which is a communication counterpart to a UID of a registered device and determines whether or not the peer device is authenticated. If the device authentication fails, subsequent functions may not be used.

The application service (AS) control function provides the following frame works for the purpose that the CNL-connected device determines a predetermined AS, wherein the AS means a service provided by a combination of applications executed on each device:

an AS parameter (ASP) showing a combination of parameter elements utilized for determination of the AS; and a procedure for obtaining a list of the ASP usable in a peer device, and a procedure for requesting a peer device to execute a predetermined application corresponding to the ASP.

The PCLC 110 supports the following use cases a and b in cooperation with a higher-level layer.

Use case a:

when the device on which an application is running is made to approach or brought into contact with a peer device, the peer device selects and starts an application corresponding to the protocol and the application running on the device; as the usage examples of this case, when a digital camera in a state of displaying a photo is brought into contact with a printer, the printer prints the photo; and use case b:

when devices on which an application is not running are made to approach or brought into contact with each other, a higher-priority one of the devices starts an application based on the preference relation between the devices; the lower-priority device selects and starts an application corresponding to the protocol and the application running on a peer device; as the usage examples of this case, when a digital camera is made to approach or brought into contact with a personal computer, an application for photo management on the personal computer starts backup of photos stored in the digital camera.

The device constituting the communication system is operated in three device modes including a proactive mode (P mode), a reactive mode (R mode), and a flexible mode (F mode), as shown in a table 1. The table 1 also shows the preference relation between the device modes. Hereinafter, the device having a relatively high priority is also referred to as a "priority device", and the device having a relatively low priority is also referred to as a "non-priority device".

TABLE 1

| Device mode | Priority | Description |
|---|---|---|
| Proactive | 2 | The device uses the AS provided from a peer device. |
| Reactive | 0 | The device waits to provide the AS in response to a request from the peer device. |
| Flexible | 1 | The device behaves differently depending on the device mode of the peer device. When the peer device is in the P mode, the device behaves similarly in the R mode and executes an application corresponding to the AS selected by the peer device. When the peer device is in the R mode, the device performs help in order to select and start an application corresponding to the AS provided from its own device and the peer device. The started application changes the device mode to the P mode and utilizes the selected AS. |

The use case a corresponds to a combination of the device in the P mode and the device in the F mode or the R mode (F/R mode), and the use case b corresponds to a combination of the device in the F mode and the device in the R mode. The CNL connection is normally established even in combinations of devices in other modes.

With regard to the sharing of functions between the initiator and the responder in the device mode and in the CNL connection, in consideration of power consumption and usage pattern of the device, the device in the P mode is provided as the initiator, the device in the R mode is provided as the responder, and the device in the F mode is provided as the initiator.

The PCLC 110 can enter the state shown in a table 2. FIG. 4 shows a state transition of the PCLC 110.

TABLE 2

| State | Description |
|---|---|
| Unconnected: S10 | The state before the device is in a connected state. After the device is made to approach or brought into contact with the peer device, when the device receives a connection request or a connection response from the peer device, the state shifts to a "connecting: S20" state. |
| Connecting: S20 | The state in which CNL connection is under establishment. When the connection establishment is completed, the state shifts to a "connected: S30" state. Specifically, when the device and the peer device are different in device mode, the state shifts to a sub-state "authentication: S31", and when they are in the same device mode, the state shifts to a sub-state "no service: S34". |
| Connected: S30 | The state in which the CNL connection is established. The state has four sub-states including "authentication: S31", "negotiation: S32", "service execution: S33", and "no service: S34". In the sub-states, if the CNL connection is released by communication timeout or transmission and reception of connection release, the state shifts to the "unconnected: S10" state. |
| (Authentication: S31) | The state in which the device authentication is in progress. When the device authentication is successfully performed, the state shifts to the sub-state "negotiation: S32". When the device authentication fails or is interrupted, the state shifts to the sub-state "no service: S34". |
| (Negotiation: S32) | The state in which the AS is under selection. When the AS is selected, the corresponding application and conversion module are started, and the state shifts to the sub-state "service execution: S33" (however, in the device in the P mode on which an application is running, only the conversion module is started). When the selection of the AS fails or is interrupted, the state shifts to the sub-state "no service: S34". |
| (Service execution: S33) | The state in which the AS is in execution. When the device receives an AS stop request from an application or the peer device, the state shifts to the sub-state "no service: S34", and the conversion module is stopped. |
| (No service: S34) | The state in which the AS is stopped, and the device waits to release the CNL connection. |

In the mutual authentication, device information is exchanged between the devices. The device information is set as a prescribed value for each device and recorded in, for example, a memory of the device. The device information includes the parameter elements including a vendor ID, a product ID, and a product class.

The vendor ID is three-byte length information allowing a vendor to be distinguished. The product ID is two-byte length information allowing a product to be distinguished. The product class is two-byte length information showing the category of a product. For example, the product class shows that the device is either a printer or a digital camera. The product ID and the product class are referred when the AS is selected.

In the negotiation, the priority device notifies the ASP to the non-priority device. The ASP is a combination of the parameter elements (protocol and protocol class) utilized for determination of the AS provided by a combination of two devices. The ASP is set as a prescribed value for each application and recorded in, for example, a memory of the device.

The protocol specifies a communication protocol for use in data transmission between applications running on the devices. The protocol class defines the rule of protocol operation for use in maintaining interconnection communication between applications running on the devices. The protocol class is defined depending on the protocol.

In the device, when the higher-level layer 100 executes the following procedure through the PCLC 110, a predetermined AS can be started. In this case, it is assumed that only one AS can be started at a time. According to the following procedure, the application corresponding to the ASP negotiated between two devices can be executed. Only the device in the P mode can set the ASP to the peer device. The procedure includes:

1. Obtaining an ASP list from the peer device;
2. Searching the AS based on the ASP list obtained from the peer device and determining a predetermined AS; and
3. Setting an ASP, corresponding to the predetermined AS, to the peer device.

3. COMMUNICATION METHOD

Figure 5:
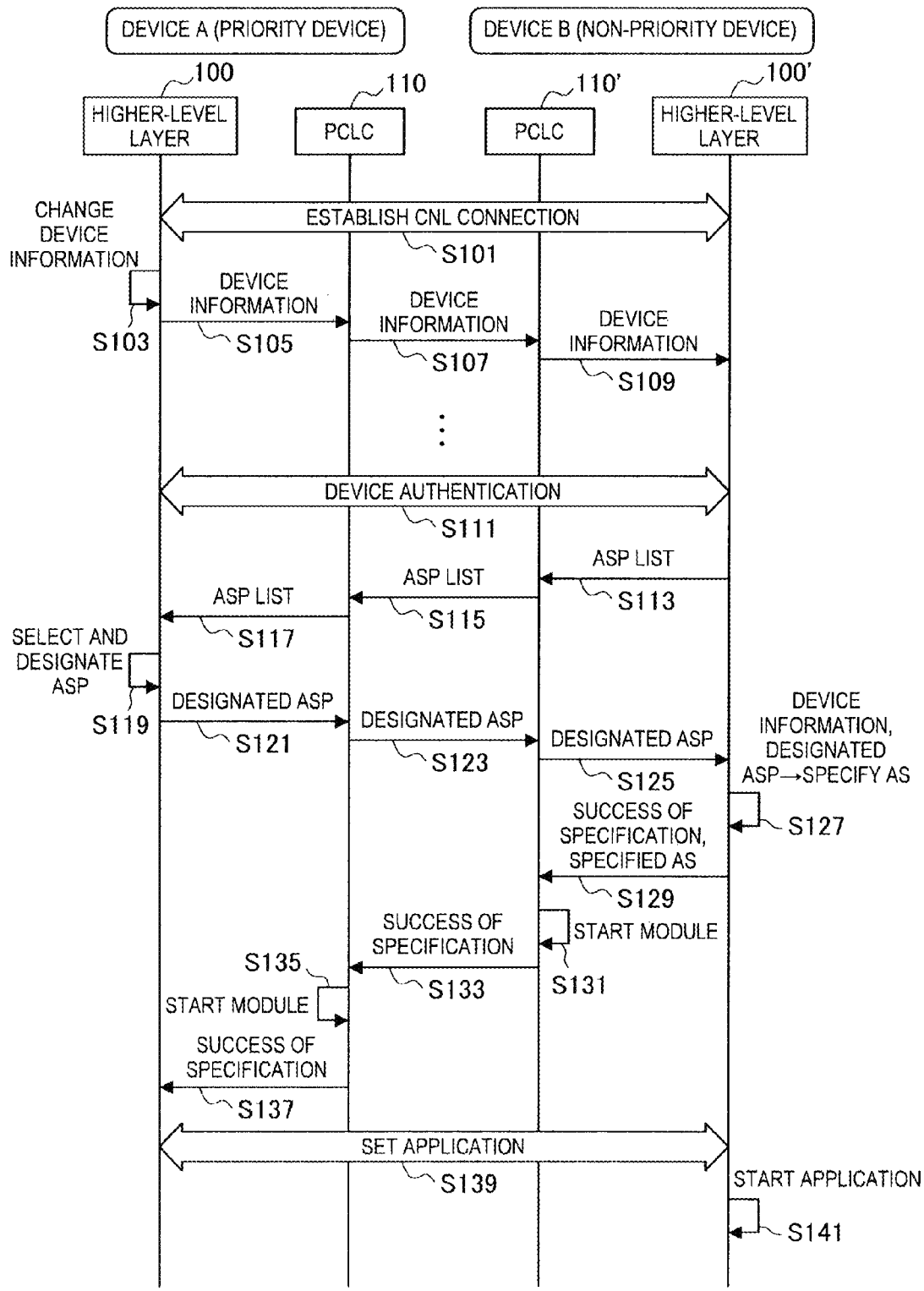
FIG. 5 is a sequence view showing a method of specifying an application, considered in device information.

Next, a communication method according to an embodiment of the present invention will be described. FIG. 5 is a sequence view showing a method of specifying an application, considered in the device information.

Hereinafter, the use case a will be described. In the use case a, the establishment of the CNL connection, the mutual authentication, and the negotiation are performed between the device A in the P mode and the device B in the F/R mode. In the device A, an application supporting a PCL function is running.

In this case, it is assumed that the device A is a digital camera, and a taken photo is selected by a user on an application running on the device A. When the device A is disposed within the communication range of the device B in the F/R mode, the establishment of the CNL connection, the mutual authentication, and the negotiation are performed between the device A and the device B, and a suitable application is started on the device B. For example, when the device B is a printer, an application for photo printing corresponds to the suitable application. When the device B is a personal computer, an application for photo editing corresponds to the suitable application.

In the establishment of the CNL connection, the PCLC version and the device mode are arbitrated between the devices A and B. The PCLC version capable of maintaining compatibility between the devices A and B is selected, and when the sharing of functions between the initiator and the responder is determined, the mutual authentication is started. In the mutual authentication, the exchange of the device information and the device authentication are performed. If the mutual authentication is completely performed, the negotiation is started.

In the negotiation, the AS is set and started. In the negotiation, the device A obtains the ASP list from the device B. The ASP list is a list of the ASP showing, for example, the protocol, which can be used by the device B, and is referred to set the AS corresponding to the protocol. The device A selects one ASP from the ASP list to notify to the device B, and the device B starts the conversion module 114 and the application corresponding to the selected ASP.

The ASP designated in the negotiation shows, as described above, the type of protocol (for example, OBEX and SCSI) and the rule of protocol operation (for example, when the protocol is OBEX, the operation is any one of push and file transfer). The device information exchanged in the mutual authentication shows, as described above, identification of a vendor (for example, Sony Corporation), identification of a product (for example, DSC-XXX), and a category (for example, a digital camera).

Thus, the device A may not designate the type of data (for example, photographic data and music data) transferred between applications and a method of processing data (for example, display/reproduction, printing, and backup). Accordingly, the device B judges the contents of the data transferred from the device A and is utilized to start the suitable conversion module 114 and a suitable application.

In the device B, if there is only one application corresponding to the protocol, the device B can specify the application to be started, according to the ASP designated in the negotiation. However, if there is a plurality of applications corresponding to the protocol, the device B may not specify the application to be started, according to the ASP designated in the negotiation.

In that case, it is considered to designate the ASP and refer to the parameter elements (the vendor ID, the product ID, and the product class) included in the device information. For example, if the device can be determined as a digital camera from Company A from the device information, the protocol corresponding to the designation of the ASP and the application corresponding to the determined device can be specified.

However, even if the device information is referred, a difficulty may occur when different applications according to the type of data are started on the same device. For example, such a case is assumed that a mobile phone or the like which can process both photographic data and music data is used. In this case, even if the category of the device A is specified from the device information, as the application to be started, the application for photo management may not be specified when a user selects the photographic data, and the application for music management may not be specified when the user selects the music data.

Accordingly, it is proposed that the device information is dynamically changed according to the type of the data selected by the user on the application of the device A, and the device B refers to the changed device information to specify the application to be started.

Hereinafter, a method of specifying an application, considered in the device information, will be described with reference to FIGS. 5, 6A and 6B. A user disposes the device A within the communication range of the device B in a state of selecting data on an application. The PLC version and the device mode are arbitrated between the devices A and B, and the CNL connection is established (step S101).

When the CNL connection is established, the mutual authentication is performed through the exchange of the device information and the device authentication. The higher-level layer 100 of the device A dynamically changes the device information according to the type of the selected data (S103) to send the information to the PCLC 110 (S105). A higher-level layer 100' of the device B obtains the changed device information through a PCLC 110' (S107 and S109). When the device A obtains the device information of the device B, the device authentication is performed between the devices A and B (S111). In order to change the device information, it is considered to dynamically change at least a portion of the information of the product class. The information of the product ID may be changed instead of or in addition to the product class. In the following description, such a case is assumed that the information of the product class is changed.

Figure 6A:
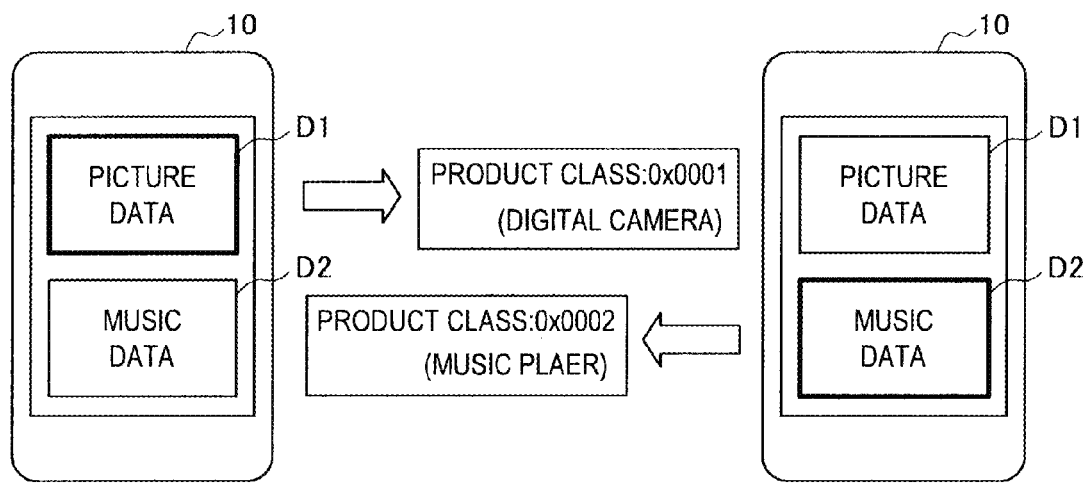
FIG. 6A is a view (1/2) showing an example of changed device information.

As the first changing method, as shown in FIG. 6A, it is considered to change the information of the product class according to the type of selected data so that a category different from the original category of the device A is shown. For example, the device A is a mobile phone 10, and when photographic data D1 is selected, the product class is changed to 0x0001 (digital camera). When music data D2 is selected, the product class is changed to 0x0002 (music player).

Figure 6B:
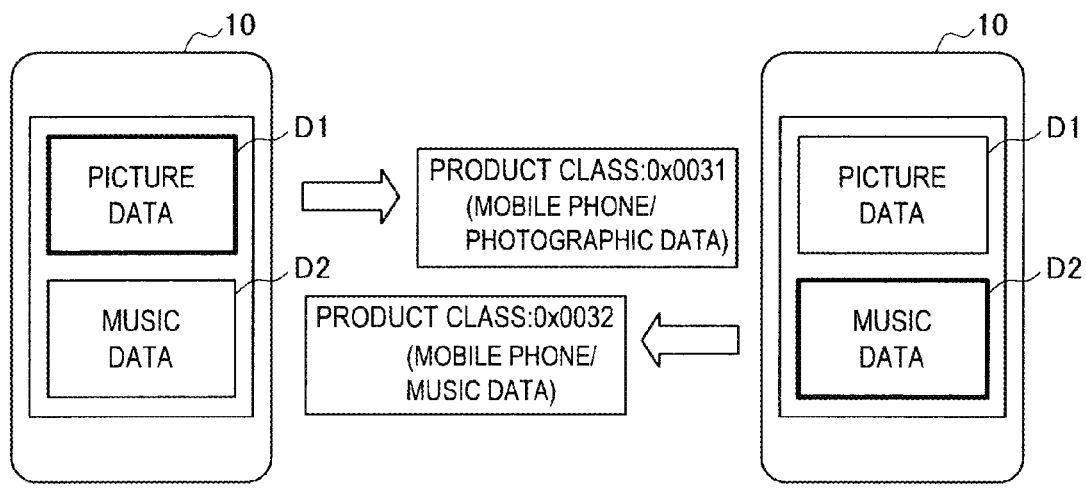
FIG. 6B is a view (2/2) showing an example of changed device information.

As the second changing method, as shown in FIG. 6B, it is considered to change the information of the product class so that the information corresponding to the type of selected data is added to the information of the product class. For example, the device A is the mobile phone 10, and when the photographic data D1 is selected, the product class is changed to 0x0031 (mobile phone/photographic data). When the music data D2 is selected, the product class is changed to 0x0032 (mobile phone/music data). In this example, the top 12 bits "0x003" of the product class are defined as subclasses representing the category (mobile phone) of the mobile phone 10, and the lower 4 bits are defined as subclasses representing the type of data (photographic data/music data).

If the mutual authentication is successfully performed, the negotiation is performed through setting of the AS. The higher-level layer 100 of the device A obtains the ASP list from the device B (S113 to S117) and selects and designates the ASP, corresponding to one protocol which can be used by its own device and the device B, from the ASP list (S119). The higher-level layer 100' of the device B obtains the designated ASP through the PCLC 110' (S121 to S125). The higher-level layer 100' specifies the type of data from the device information and specifies the protocol from the ASP to thereby specify the AS (S127).

The higher-level layer 100' notifies the success of the specification of the AS and the specified AS to the PCLC 110' (S129). The PCLC 110' selects and starts the conversion module 114 corresponding to the specified AS (S131). The PCLC 110 of the device A selects and starts the conversion module 114 corresponding to the specified AS (S135) and notifies to the higher-level layer 100 (S137). According to this constitution, setting of the AS is completed between the devices A and B (S139), and the higher-level layer 100' of the device B selects and starts the application corresponding to the type of data and the protocol (S141).

If the first changing method is applied, the application of the device B can specify the application to be started, in consideration of the category of the device A specified from the product class. For example, when the photographic data/music data is selected, the device B starts the application for photo management/music management, referring to the category (digital camera/music player) of the device A specified from the product class.

If the second changing method is applied, the device B can specify the application to be started, in consideration of the type of data specified from the subclass of the product class. For example, when the photographic data/music data is selected, the device B starts the application for photo management/music management, referring to the type of data (photographic data/music data) specified from the product class.

4. DETAILS OF COMMUNICATION METHOD

Figure 7A:
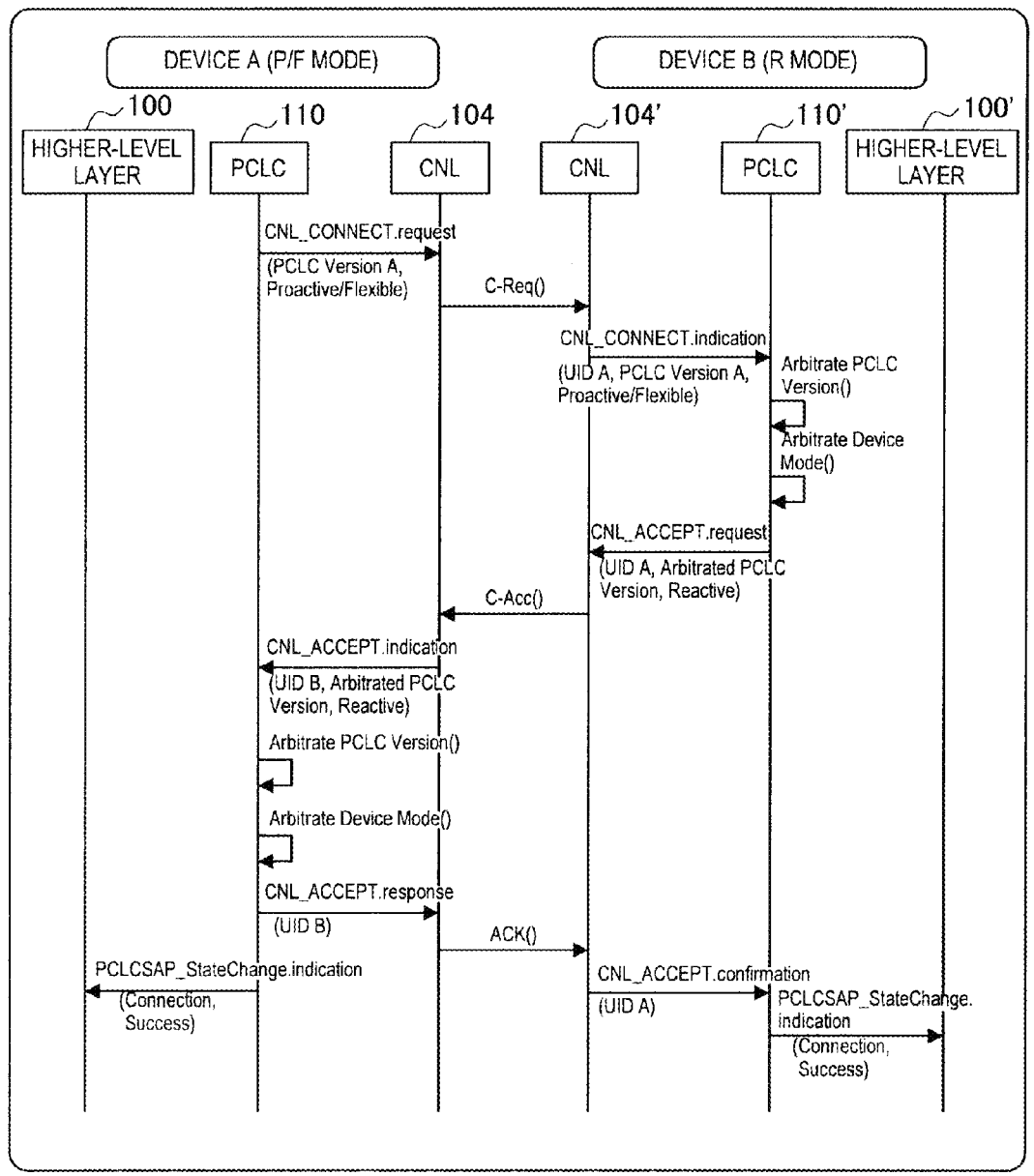
FIG. 7A is a sequence view (1/2) showing a processing example in establishment of CNL connection.
Figure 7B:
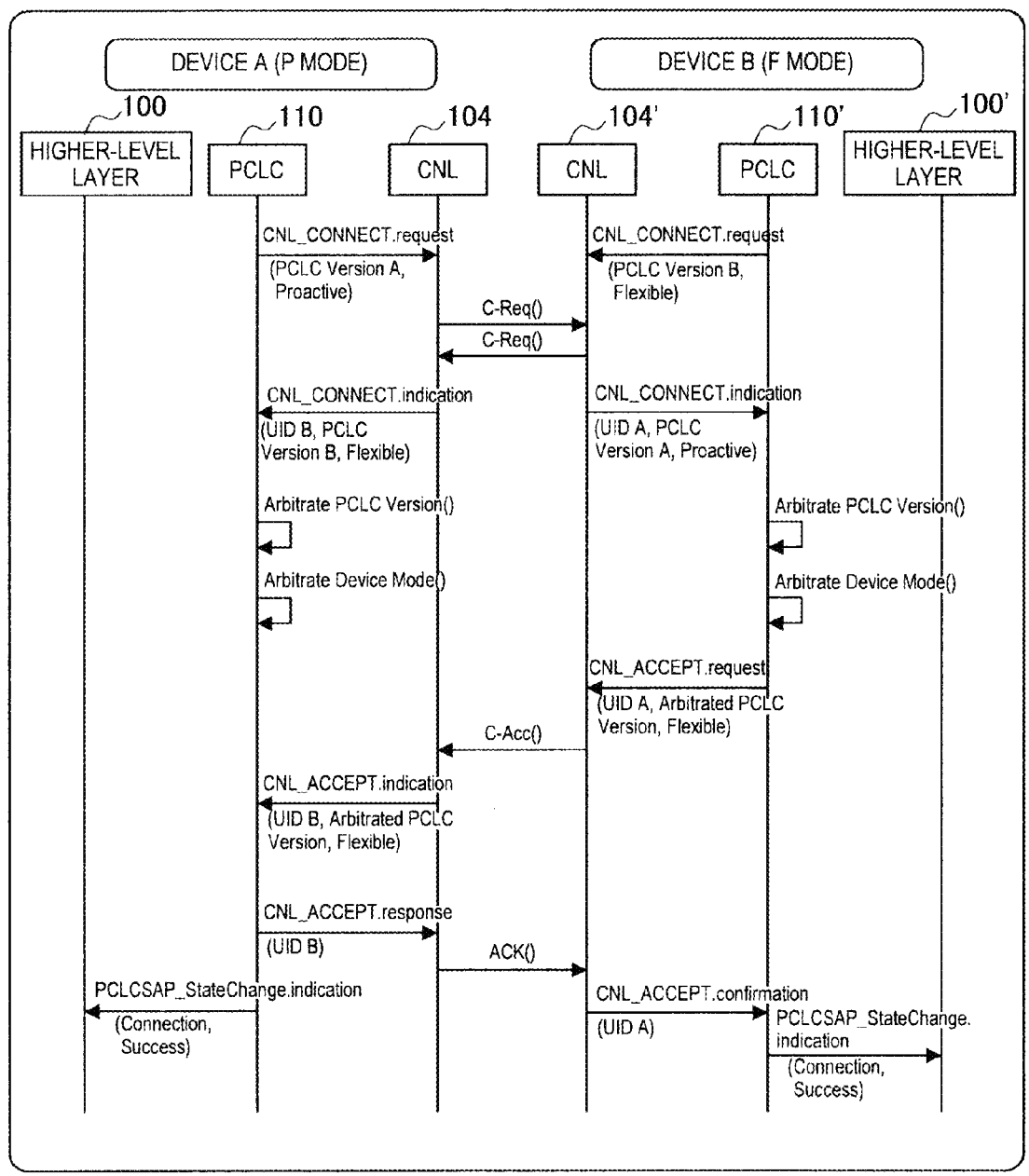
FIG. 7B is a sequence view (2/2) showing a processing example in establishment of CNL connection.
Figure 8:
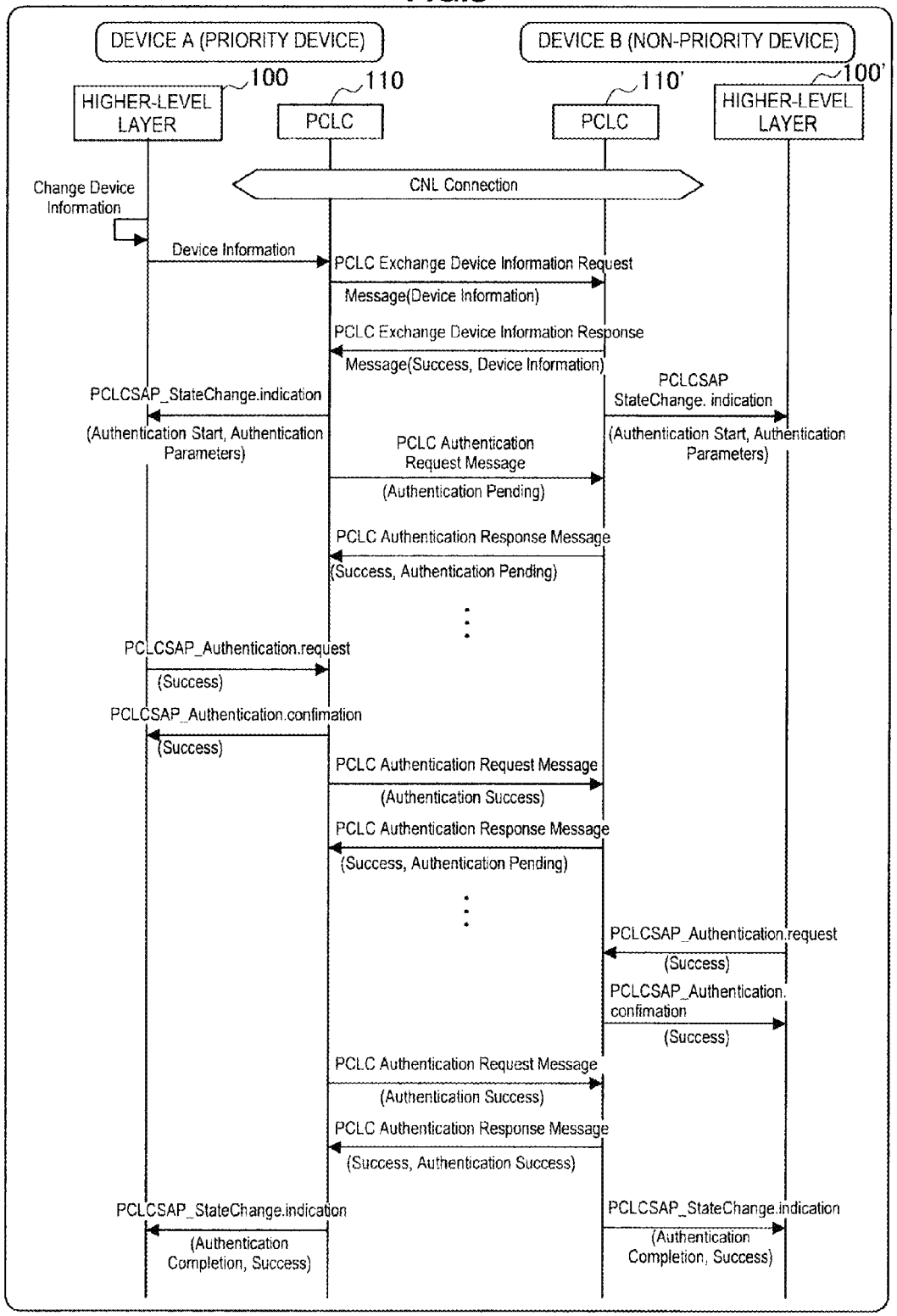
FIG. 8 is a sequence view showing a processing example in mutual negotiation.
Figure 9:
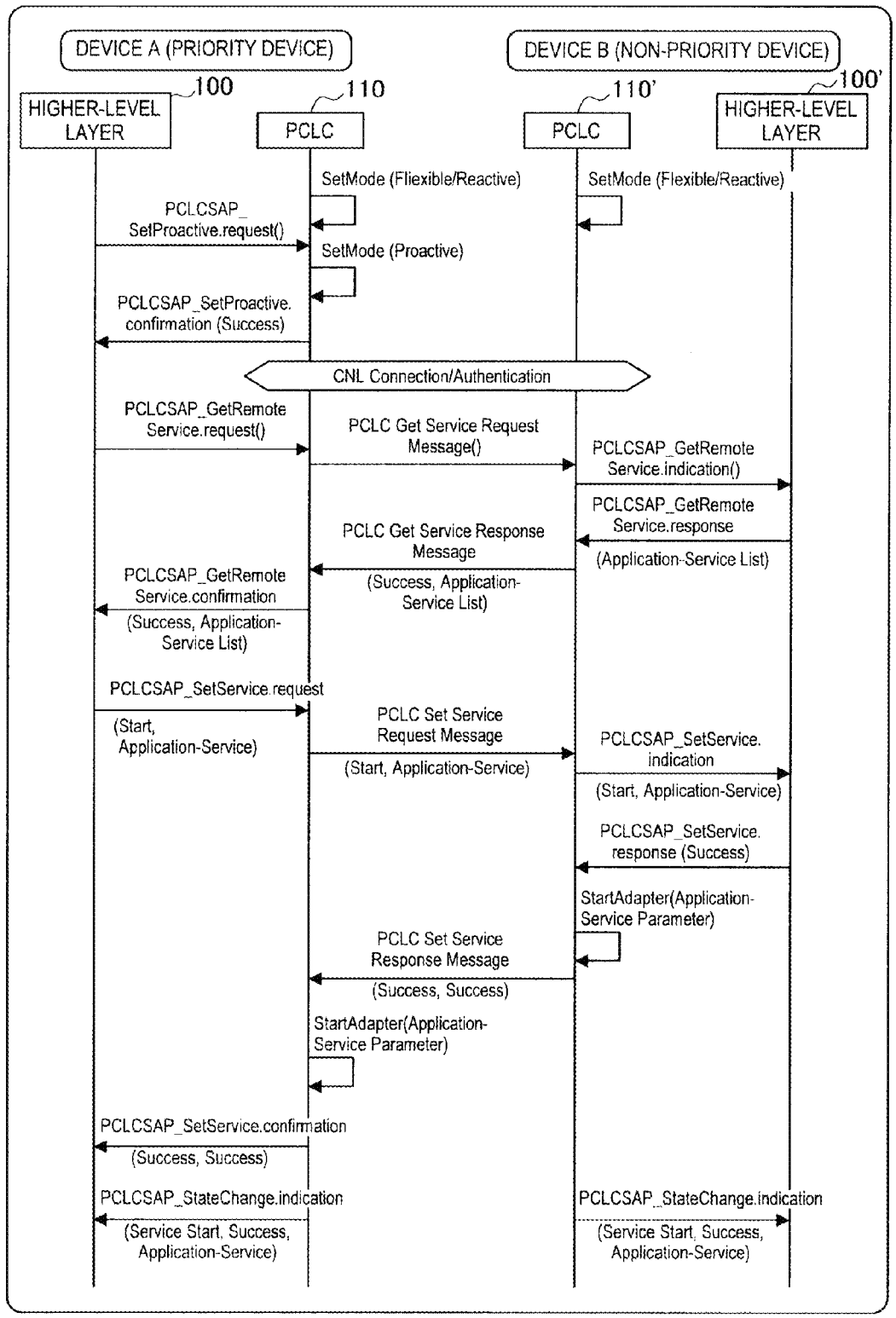
FIG. 9 is a sequence view showing a processing example in negotiation.

Next, the operation of the communication system will be described in detail. FIGS. 7A and 7B are sequence views showing a processing example in the establishment of the CNL connection. FIG. 8 is a sequence view showing a processing example in the mutual authentication. FIG. 9 is a sequence view showing a processing example in the negotiation.

[4-1. Establishment of CNL Connection]

FIG. 7A shows a processing example in which the CNL connection is established between the device A in the P/F mode and the device B in the R mode. In this case, the device A is operated as the initiator, and the device B is operated as the responder. When the devices A and B are disposed within the communication range, the establishment of the CNL connection is started.

In the device A, PCLC 110 sends, to the CNL 104, a connection request including the information of the PCLC version of the device A (PCLC version A) and the information of the device mode of the device A (P/F mode), and the CNL 104 transmits a connection request (C-Req) to the device B. In the device B, the CNL 104' receives the request to send, to the PCLC 110', a connection indication including the information of the unique ID of the device A (UIDA), the PCLC version A, and the P/F mode.

The PCLC 110' performs arbitration for each of the PCLC version and the device mode. In the arbitration of the PCLC version, the latest PCLC version capable of maintaining compatibility between the devices A and B is selected from the PCLC versions that can be used in the devices A and B. In the arbitration of the device mode, the device modes of the devices A and B are compared, and the device operated as the responder is determined In FIG. 7A, the device A is in the P/F mode, and the device B is in the R mode; therefore, the device B is the responder. For example, when both the devices A and B are in the P mode or the F mode, the unique ID is utilized for determining the device operated as the responder.

The PCLC 110' sends, to the CNL 104', an acceptance request including the information of the unique ID of the device B (UIDB), the arbitrated PCLC version, and the device mode of the device B (R mode). The CNL 104' transmits a connection acceptance (C-Acc) to the device A.

In the device A, the CNL 104 obtains the acceptance to send, to the PCLC 110, a CNL acceptance indication including the same information as that of the acceptance request. The PCLC 110 performs arbitration for each of the PCLC version and the device mode and sends an acceptance response including the information of the UIDB to the CNL 104. The PCLC 110 transmits an acknowledgement (ACK) to the device B, and, at the same time, sends a state change indication including the information of connection success to the higher-level layer 100 through the PCLC-SAP 121. In the device B, the CNL 104' receives the acknowledgement and sends an acceptance response including the information of the UIDA to the PCLC 110'. The PCLC 110' sends the state change indication including the information of connection success to the higher-level layer 100' through the PCLC-SAP 121.

FIG. 7B shows a processing example in which the CNL connection is established between the device A in the P mode and the device B in the F mode. In this case, first of all, the devices A and B are operated as the initiators. After the arbitration of the device mode, the device A is operated as the initiator, and the device B is operated as the responder. When the devices A and B are disposed within the communication range, the establishment of the CNL connection is started.

In the devices A and B, the PCLCs 110 and 110' send the connection request to the CNLs 104 and 104', the CNLs 104 and 104' transmit/receive the connection request (C-Req) to/from the peer device and send the connection indication to the PCLCs 110 and 110'. In the devices A and B, the PCLCs 110 and 110' perform arbitration for each of the PCLC version and the device mode. When the device B is operated as the responder by the arbitration of the device mode, in the device B, the PCLC 110' sends the acceptance request to the CNL 104', and the CNL 104' transmits the connection acceptance (C-Acc) to the device A.

In the device A, the CNL 104 receives the acceptance to transmit the acceptance indication to the PCLC 110, and the PCLC 110 sends an acceptance response to the CNL 104. The PCLC 110 sends a state change indication including the information of a state of connection success to the higher-level layer 100, and the CNL 104 transmits an acknowledgement (ACK) to the device B. In the device B, the CNL 104' receives the acknowledgement to send the acceptance response including the information of the UIDA to the PCLC 110'. The PCLC 110' sends the state change indication including the information of connection success to the higher-level layer 100'.

[4-2. Mutual Authentication]

FIG. 8 shows a processing example in which after the establishment of the CNL connection, the mutual authentication is performed between the device A which is the priority device and the device B which is the non-priority device.

In the device A, as described above, the higher-level layer 100 dynamically changes the device information of its own device according to the type of data selected by a user and sends the changed device information to the PCLC 110. In the device A, the PCLC 110 transmits, to the device B, a device information request message including the changed device information of the device A. In the device B, the PCLC 110' sends a device information response message including the device information of the device B to the PCLC 110 of the device A. In the devices A and B, the PCLCs 110 and 110' send a state change indication, including the information of start of the mutual authentication and the information of an authentication parameter, to the higher-level layers 100 and 100'. The authentication parameter includes the unique ID and the device information of the peer device.

In the device A, the PCLC 110 transmits an authentication request message including the information of authentication suspension to the device B. In the device B, the PCLC 110' transmits an authentication response message including the information of the authentication suspension to the device A. In the device A, when the PCLC 110 receives the authentication response message, a new authentication request message is transmitted to the device B.

In the device A, when the PCLC 110 receives an authentication request including the information of authentication success from the higher-level layer 100, an authentication response is sent to the higher-level layer 100. According to this constitution, the device authentication of the device A is completed. In the device A, the PCLC 110 transmits an authentication request message including the information of the authentication success to the device B. However, in the device B, the device authentication is not completed, and therefore, the PCLC 110' transmits an authentication response message including the information of authentication suspension to the device A.

In the device B, when the PCLC 110' receives the authentication request including the information of authentication success from the higher-level layer 100', the authentication response is sent to the higher-level layer 100'. According to this constitution, the device authentication of the device B is completed. When the PCLC 110' receives the authentication request message including the information of authentication success, the PCLC 110' transmits the authentication response message including the information of authentication success to the device A. When the device authentication is completed in both the devices A and B, in the devices A and B, the PCLCs 110 and 110' send a state change indication including the information of authentication completion to the higher-level layers 100 and 100'.

[4-3. Negotiation]

FIG. 9 shows a processing example in which after the establishment of the CNL connection and the mutual authentication, the negotiation is performed between the device A which is the priority device and the device B which is the non-priority device.

In the devices A and B, the PCLCs 110 and 110' set the device mode to the F/R mode. In the device A, when the PCLCs 110 and 110' receives a P-mode setting request from the higher-level layers 100 and 100', the device mode is set to the P mode, and a P-mode setting response is sent to the higher-level layers 100 and 100'. In the devices A and B, the negotiation is performed after the establishment of the CNL connection and the mutual authentication.

In the device A, when receiving a service acquisition request from the higher-level layer 100, the PCLC 110 transmits a service acquisition request message to the device B. In the device B, the PCLC 110' receives the service acquisition request message to send a service acquisition indication to the higher-level layer 100', and, thus, to receive a service acquisition response from the higher-level layer 100', whereby the PCLC 110' transmits a service acquisition response message to the device A. The service acquisition response and the service acquisition response message include the ASP list showing the AS supported by the device B.

In the device A, the PCLC 110 receives the service acquisition response message and sends a service acquisition response including the ASP list to the higher-level layer 100. At this time, for example, the higher-level layer 100 searches the ASP list obtained from the device B and determines whether the AS started by the device A is available. This example shows a case where the AS started by the device A is supported by the device B. The higher-level layer 100 sets a predetermined AS by the protocol version and the protocol class arbitrated by the device B.

The higher-level layer 100 sends a service setting request to the PCLC 110 in order to request the device B to start a specified AS. The PCLC 110 transmits a service setting request message to the device B. The service setting request and the service setting request message include information showing service start of the specified AS.

In the device B, the PCLC 110' receives the message and sends a service setting indication to the higher-level layer 100'. As described above, the higher-level layer 100' extracts information that allows the type of data selected on the application of the device A from the device information. Then, the application corresponding to the type of data and the specified AS is selected.

At that time, the higher-level layer 100' determines whether the AS requested by the device A is available, for example. FIG. 9 shows a case where the AS requested by the device A is available. By virtue of the setting of the AS by the device A, the application is started in the higher-level layer 100' of the device B, whereby when the AS becomes available, a service setting response is executed.

The higher-level layer 100' sends the service setting response to the PCLC 110'. The PCLC 110' starts the conversion model 114 corresponding to the protocol designated by the ASP and transmits a service setting response message to the device A. In the device A, the PCLC 110 receives the message to start the conversion module 114 corresponding to the protocol designated by the ASP, and, thus, to send the service setting response to the higher-level layer 100. In the devices A and B, the PCLCs 110 and 110' send a state change indication including the information of service start to the higher-level layers 100 and 100'.

5. CONCLUSION

As described above, according to the communication system according to the present embodiment, the authentication information (device information) is dynamically changed according to the type of data selected on an application to be transmitted to another communication device. One protocol which can be used by its own device and another communication device is selected, and information (ASP) showing the selected protocol is transmitted to the another communication device. Then, an application corresponding to the type of data and the selected protocol is started by the another communication device. According to this constitution, even if there is a plurality of applications corresponding to the protocol, another communication device refers to authentication information dynamically changed according to the type of selected data and can specify the application to be started.

It should be understood by those skilled in the art that various modifications, combinations, sub-combinations and alterations may occur depending on design requirements and other factors insofar as they are within the scope of the appended claims or the equivalents thereof.

For example, in the description of the above embodiment, the device information is changed and notified before the device authentication in the mutual authentication processing (when the device information is exchanged). However, the device information may be changed and/or notified after the device authentication or when the negotiation processing is started (before the non-priority device specifies the AS).

The present application contains subject matter related to that disclosed in Japanese Priority Patent Application JP 2009-270643 filed in the Japan Patent Office on Nov. 27, 2009, the entire content of which is hereby incorporated by reference.

What is claimed is:

1. A communication device comprising:
   one or more processors operable to:
   perform one-to-one communication with another communication device through electric field coupling or magnetic field coupling;
   dynamically change authentication information, used in mutual authentication with the another communication device, based on a type of data selected on an application of the communication device, wherein the authentication information comprises a product class, wherein the product class represents a category of the communication device, and the type of data selected on the application of the communication device;
   select a protocol that can be utilized by the communication device and the another communication device,
   wherein the protocol is selected by the communication device when a device mode of the communication device has a priority higher than a device mode of the another communication device, and
   wherein the another communication device selects and starts an application corresponding to the type of data and the selected protocol,
   wherein the another communication device specifies the application to be started based on the category of the communication device specified from the product class.

2. The communication device according to claim 1, wherein the one or more processors are operable to:

authentication information from the another communication device when the device mode of the communication device is lower than the device mode of the another communication device, wherein the authentication information is dynamically changed according to a type of data selected on an application of the another communication device;

receive information indicating a protocol selected by the another communication device and utilized by the communication device and the another communication device; and start an application corresponding to the type of data selected on the application of the another communication device and the protocol selected by the another communication device.

3. The communication device according to claim 2, wherein the communication device is operated in a first device mode in which the communication device receives an application service from the another communication device and a second device mode in which the communication device transmits the application service to the another communication device, wherein when the communication device is operated in the first device mode, information indicating the authentication information and the selected protocol is transmitted to the another communication device and wherein when the communication device is operated in the second device mode, the communication device receives the information indicating the selected protocol from the another communication device.

4. The communication device according to claim 3, wherein the communication device is operated in a third device mode in which the communication device operates in one of the first device mode or the second device mode, based on the device mode of the another communication device;

wherein, when the another communication device is operated in the second device mode, the communication device is operated in the first device mode; and when the another communication device is operated in the first device mode, the communication device is operated in the second device mode.

5. The communication device according to claim 1, wherein the one or more processors are operable to change at least a portion of device information, included in the authentication information, based on the type of data selected on the application of the communication device.

6. A communication system comprising:

a first communication device operable to:

perform one-to-one communication with a second communication device through electric field coupling or magnetic field coupling;

the second communication device operable to:

dynamically change authentication information, used in mutual authentication with the first communication device, based on a type of data selected on an application of the second communication device, wherein the authentication information comprises a product class, wherein the product class represents a category of the second communication device, and the type of data selected on the application of the second communication device;

select a protocol that can be utilized by the second communication device and the first communication device;

wherein the protocol is selected by the second communication device when a device mode of the second communication device has a priority higher than a device mode of the first communication device, wherein the first communication device selects and starts an application corresponding to the type of data and the selected protocol, wherein the first communication device specifies the application to be started based on the category of the second communication device specified from the product class; and convert the selected protocol into a protocol utilized by the physical layer to transfer data between the application on the second communication device and the application on the first communication device.

7. A communication method comprising:

in a communication device:

establishing one-to-one communication with another communication device through electric field coupling or magnetic field coupling;

dynamically changing authentication information, used in mutual authentication with the another communication device, based on a type of data selected on an application of the communication device, wherein the authentication information comprises a product class, wherein the product class represents a category of the communication device, and the type of data selected on the application of the communication device;

selecting a protocol that can be utilized by the communication device and the another communication device, wherein the protocol is selected by the communication device when a device mode of the communication device has a priority higher than a device mode of the another communication device, wherein the another communication device selects and starts an application corresponding to the type of data and the selected protocol, and wherein the another communication device specifies the application to be started based on the category of the communication device specified from the product class.

8. A non-transitory computer-readable storage medium having stored thereon, a computer program having at least one code section, the at least one code section being executable by a computer for causing the computer to perform steps comprising:

establishing one-to-one communication with another communication device through electric field coupling or magnetic field coupling;

dynamically changing authentication information, used in mutual authentication with the another communication device, based on a type of data selected on an application of the communication device, wherein the authentication information comprises a product class, wherein the product class represents a category of the communication device, and the type of data selected on the application of the communication device;

selecting a protocol that can be utilized by the communication device and the another communication device;

wherein the protocol is selected by the communication device when a device mode of the communication device has a priority higher than a device mode of the another communication device, wherein the another communication device selects and starts an application corresponding to the type of data and the selected protocol, and wherein the another communication device specifies the application to be started based on the category of the communication device specified from the product class.

9. The communication device according to claim 1, wherein the authentication information comprises a registered unique identifier (ID) of the another communication device and indicates if the another communication device is authenticated.

10. The communication device according to claim 1, wherein the one or more processors are operable to:
- receive an application service parameter (ASP) list from the another communication device,
- wherein an ASP comprises:
  - a protocol parameter; and
  - a protocol class parameter;
- search the received ASP list for a predetermined application service (AS);
- set an ASP corresponding to the predetermined AS to the another communication device.

11. The communication device according to claim 1, wherein the one or more processors are operable to:
- convert the selected protocol into a protocol of a physical layer of the open systems interconnection (OSI) model to transfer data between the communication device and the another communication device,
- wherein the selected protocol is used by an application layer and a presentation layer of the OSI model.

* * * * *